United States Patent
Fülling et al.

(10) Patent No.: US 11,512,426 B2
(45) Date of Patent: Nov. 29, 2022

(54) PROCESS FOR OBTAINING CELLULOSE

(71) Applicant: Rainer Fülling, Remscheid (DE)

(72) Inventors: Rainer Fülling, Remscheid (DE);
Heiko Schlabach, Halver (DE)

(73) Assignee: Rainer Fülling, Remscheid (DE)

( * ) Notice: Subject to any disclaimer, the term of this patent is extended or adjusted under 35 U.S.C. 154(b) by 0 days.

(21) Appl. No.: 14/907,384

(22) PCT Filed: Jul. 25, 2014

(86) PCT No.: PCT/EP2014/066071
§ 371 (c)(1),
(2) Date: Jan. 25, 2016

(87) PCT Pub. No.: WO2015/011275
PCT Pub. Date: Jan. 29, 2015

(65) Prior Publication Data
US 2016/0168790 A1 Jun. 16, 2016

(30) Foreign Application Priority Data
Jul. 25, 2013 (EP) .................................... 13178083

(51) Int. Cl.
| | |
|---|---|
| D21C 1/10 | (2006.01) |
| D21C 5/02 | (2006.01) |
| C08H 8/00 | (2010.01) |
| C08L 1/02 | (2006.01) |
| D21C 1/00 | (2006.01) |
| C08B 1/00 | (2006.01) |
| D21C 3/22 | (2006.01) |
| D21C 3/02 | (2006.01) |
| D21C 7/14 | (2006.01) |
| C08L 97/02 | (2006.01) |
| D21C 7/00 | (2006.01) |
| D21C 11/00 | (2006.01) |
| D21C 11/04 | (2006.01) |
| D21C 9/08 | (2006.01) |

(52) U.S. Cl.
CPC ............... *D21C 3/02* (2013.01); *C08B 1/00* (2013.01); *C08H 8/00* (2013.01); *C08L 1/02* (2013.01); *C08L 97/02* (2013.01); *D21C 1/00* (2013.01); *D21C 1/10* (2013.01); *D21C 3/224* (2013.01); *D21C 5/02* (2013.01); *D21C 7/00* (2013.01); *D21C 7/14* (2013.01); *D21C 9/08* (2013.01); *D21C 11/00* (2013.01); *D21C 11/04* (2013.01); *Y02E 50/10* (2013.01); *Y02W 30/64* (2015.05)

(58) Field of Classification Search
CPC .................................. C07H 15/04; C07H 1/06
USPC ........................................................ 536/127
See application file for complete search history.

(56) References Cited

U.S. PATENT DOCUMENTS

| | | | | | |
|---|---|---|---|---|---|
| 4,311,554 | A | * | 1/1982 | Herr | ......................... C04B 18/28 162/159 |
| 5,865,898 | A | * | 2/1999 | Holtzapple | ............. C01F 11/18 127/37 |
| 6,333,181 | B1 | * | 12/2001 | Ingram | ................... C12N 13/00 435/165 |
| 2003/0192831 | A1 | | 10/2003 | Langenecker | |
| 2010/0121047 | A1 | * | 5/2010 | Titmas | ..................... D21C 1/06 536/124 |
| 2010/0196981 | A1 | * | 8/2010 | Aharon | ................ A23K 20/163 435/165 |
| 2016/0177066 | A1 | * | 6/2016 | Aharon | ..................... C08L 1/02 106/163.01 |

FOREIGN PATENT DOCUMENTS

| | | | | |
|---|---|---|---|---|
| CN | 101942027 | A | * | 1/2011 |
| EP | 1310461 | A1 | | 5/2003 |
| JP | 01183599 | A | * | 7/1989 |
| JP | 2005046691 | A | | 2/2005 |

(Continued)

OTHER PUBLICATIONS

Aso, Shinji (JP 2005046691 A) English Language Machine Translated.*
RunCang Sun et al ("Comparative study of lignins isolated by alkali and ultrasound-assisted alkali extractions from wheat straw", Ultrasonic Sonochemistry, 9, (2002), p. 85-93) (Year: 2002).*
Yujing Sun et al (Effects of different factors of ultrasound treatmenton the extraction yield of the all-trans-β-carotene from citrus peels, Ultrsonics Sonochemistry, 18, (2011), p. 243-249) (Year: 2011).*
Pan et al., "Concinuous and Pulsed Ultrasound-assisted extractions of antioxidants from pomegranate peel" Ultrasonics Sonochemistry vol. 18 pp. 1249-1257 DOI:10/1016/j.ultsonch.2011.01.005 (Year: 2011).*

(Continued)

*Primary Examiner* — Eric Olson
(74) *Attorney, Agent, or Firm* — Schwegman Lundberg & Woessner, P.A.

(57) ABSTRACT

The present invention relates to a process for obtaining cellulose or a mixture containing at least cellulose and at least lignocellulose from at least one substrate that is at least to some extent amenable to fermentation comprising at least the steps of (1) to (3) and optionally (4), namely conversion of the substrate via addition of at least one inorganic base into an aqueous mixture with pH≥8.5 (step 1), ultrasound treatment of the aqueous mixture obtained after step (1) (step 2), separation of the aqueous mixture obtained after step (2) into a liquid aqueous phase and a disperse mixture containing, cellulose or a mixture containing at least cellulose and at least lignocellulose (step 3) and optionally purification of the disperse mixture obtained after step (3) containing cellulose or of the mixture containing at least cellulose and at least lignocellulose (step 4), where step (1) and step (2) of the process respectively are carried out at a temperature <100° C. and Where the ultrasound treatment in step (2) takes place in one or more treatment phases, where the duration of a treatment phase is in the range from 0.2 to 60 seconds and each treatment phase is carried out with a sonotrode frequency in the range from 14 to 22 kHz.

23 Claims, No Drawings

(56) References Cited

FOREIGN PATENT DOCUMENTS

JP    2006068603 A      3/2006
KR    2012119354 A  *  10/2012

OTHER PUBLICATIONS

Misonix Sonicator(R) 3000 operation manual, published by Misonix Inocorporated, downloaded from www.manualslib.com (Year: 2022).*

Wu et al., "Studies on the effects of pretreatment on production hydrogen from municipal sludge anaerobic fermentation" Natural Science vol. 1 pp. 10-16 http://dx.doi.org/10.4236/ns.2009.11003 (Year: 2009).*

"International Application Serial No. PCT/EP2014/066071, International Preliminary Report on Patentability dated Jan. 28, 2016", 6 pgs.

* cited by examiner

PROCESS FOR OBTAINING CELLULOSE

PRIORITY APPLICATIONS

This application is a U.S. National Stage Filing under 35 U.S.C. 371 from International Application No. PCT/EP2014/066071, filed on 24 Jul. 2014, and published as WO 2015/011275 on 29 Jan. 2015, which claims the benefit under 35 U.S.C. 119 to European Application No. 13178083.5, filed on 25 Jul. 2013: which applications and publication are incorporated herein by reference in their entirety.

The present invention relates to a process for obtaining cellulose or a mixture containing at least cellulose and at least lignocellulose from at least one substrate that is at least to some extent amenable to fermentation comprising at least the steps (1) to (3) and optionally (4), namely conversion of the substrate via addition of at least one inorganic base into an aqueous mixture having a pH≥8.5 (step 1), ultrasound treatment of the aqueous mixture obtained after step (1) (step 2), separation of the aqueous mixture obtained after step (2) into a liquid aqueous phase and a disperse mixture containing cellulose or a mixture containing at least cellulose and at least lignocellulose (step 3) and optionally purification of the disperse mixture obtained after step (3) containing cellulose or of the mixture containing at least cellulose and at least lignocellulose (step 4), wherein step (1) and step (2) of the process are both carried out at a temperature of <100° C., and wherein the ultrasound treatment in step (2) is effected in one or more treatment phases, where the duration of a treatment phase is in the range from 0.2 to 60 seconds and each treatment phase is carried out at a sonotrode frequency in a range from 14 to 22 kHz.

Cellulose is a catenated polysaccharide generally having several thousand glucose units which are linked via β-1,4-glycosidic bonds. The chains have been twisted into long, parallel ordered fibrils having a microcrystalline character. This results in the known fiber structure of cellulose with a fixed character, which has a structured molecular assembly. Lignocellulose consists of a skeleton of cellulose and optionally also hemicellulose and also optionally further polyoses. The skeleton features lignin in this case. The lignins contained in the lignocellulose and other polyoses and their tight physical binding to the cellulose confer a particularly solid and robust character to the fiber structure.

Cellulose is an important raw material for paper production, for producing articles of clothing and may also be used as fuel for heating or as an insulating material. In addition, cellulose serves as an important natural constituent of foodstuffs and feedstuffs. Many derivatives of cellulose also serve as starting materials for industrial applications: for instance, xanthogenized cellulose is used to prepare viscose and, for example, methyl cellulose, cellulose acetate and cellulose nitrate are used in the construction industry, textile industry or in the chemical industry. Lignocellulose is used, for example, in the form of wood materials as a construction material or fuel. Cellulose can also be degraded to glucose or oligomers of glucose by means of cellulase. These products in turn serve to produce further substrates such as ethanol, butyric acid, butanol, acetone, citric acid and itaconic acid.

Cellulose and also lignocellulose, particularly cellulose, are inherently present in large amounts in nature, which is why there is a need for novel methods to obtain, particularly to isolate, these renewable raw materials from substrates containing biomass.

Substrates amenable to fermentation, such as raw sludge, particularly raw sludge originating from waste water, are known to those skilled in the art. In the case of fermentation, i.e. in the anaerobic degradation of these substrates by microorganisms, methane fermentation is paramount. In methane fermentation, methane and carbon dioxide are formed as main products at the end of the degradation chain by various interdependent living microorganisms. As is known, the gas mixture produced is also referred to as biogas and currently has a significant industrial and economic relevance, particularly in the energy generation sector.

The substrates mentioned, however, do not consist only of organic material which can be efficiently degraded by fermentation such as proteins, fats and water-soluble carbohydrates. In fact, they also contain, in particular, organic components such as cellulose and lignocellulose.

However, obtaining cellulose and/or lignocellulose, particularly cellulose, from such substrates is complicated by the presence of many further organic constituents in such substrates: these include, in particular, other water-insoluble polysaccharides, proteoglycans, glycoproteins and glycolipids which also generally contain various, usually acetylated amino sugars. Such constituents often occur in the substrates mentioned as complex matrices or are organized as spongy, three-dimensional networks usually having a gel-like, i.e. amorphous and highly water-retaining structure. The substances mentioned themselves thus have only limited water-solubility and therefore bind a large amount of water. Intermolecular interactions such as hydrogen bonds and dipole-dipole interactions are usually responsible for maintaining the network, wherein the strong affinity for water is also explained by these forces. From among the substrates mentioned, particularly sludges originating from waste water such as raw sludge, the gels mentioned are obtained, also referred to as EPS (extracellular polymeric substances) for example. The EPS are formed by most microorganisms and, owing to their complex structure, form a protective matrix for microbial agglomerates such as biofilms. They also allow, for example, the adhesion of microorganism cultures to surfaces. In particular their mostly mucous-like, complex gel structure has the consequence that degradation by anaerobic fermentation can only take place with difficulty. It has been shown that these substances are only amenable to a corresponding microbial cleavage under anaerobic conditions over a long period of time.

The presence of these constituents which cannot be degraded, or only with difficulty, is problematic because it impedes or prevents the specific isolation of cellulose and/or lignocellulose, particularly cellulose, from such substrates amenable to fermentation such as in particular raw sludge originating from waste water.

In the processing of waste water in sewage treatment plants, a coarse pre-purification is typically carried out initially by raking and/or sand traps. The pre-purified waste water is then transferred to a primary sedimentation tank. The waste water is slowly passed through this tank, wherein contaminants settle out (sediment) or float to the surface. By mechanically removing these contaminants, the so-called primary sludge is obtained. The remaining waste water is then further purified by aerobic microorganisms, wherein the organic components present in the waste water after mechanical purification are utilized by the aerobic microorganisms (aerobic activated sludge plant) such that sufficiently purified water is finally formed. The microorganism population continuously growing in the aerobic activated sludge plant by utilizing the contaminants is regularly removed (secondary sludge, excess sludge) and usually combined with the primary sludge.

The sludge resulting from the purification of the primary sludge and secondary sludge is typically referred to as raw sludge. It generally comprises a comparatively high water content (98 to 99.5 wt %, based on the total weight of the raw sludge). The solids fraction is composed of the organic compounds described above and also of microorganisms originating from the secondary sludge and typically additionally comprises a fraction of inorganic compounds. The organic fraction, in addition to stable compounds such as cellulose and/or lignocellulose, also comprises readily degrading organic material such as water-soluble polysaccharides, proteins and fats. Low molecular weight fatty acids, ammonia or hydrogen sulfide, for example, are formed in this digestion.

The raw sludge in a next step is subjected to a controlled anaerobic digestion or fermentation, typically in digestion towers. Here, the readily degrading compounds are decomposed in stages by anaerobic bacterial cultures. By means of a first phase, the so-called hydrolysis and acidification phase, the substances are mainly converted to low molecular weight fatty acids or carboxylic acids and alcohols, and also hydrogen and carbon dioxide, by relevant microorganisms. Finally, acetic acid is formed via the acetogenic phase, which is then converted in the second stage, the methane phase, to methane and carbon dioxide by relevant microorganisms (methane bacteria). The conversion of hydrogen and carbon dioxide to methane and water is also effected. In addition to methane as main product, which is discharged in a controlled manner, and which is then utilized as biogas component or for general energy generation (grid feed), nitrogen-based compounds, for example, such as, in particular, ammonia or corresponding ammonium salts are produced in the digestion tower. The so-called digested sludge remaining after the approximately 20-to-30 day digestion process (stabilized sewage sludge) comprises, in addition to inorganic compounds, the inorganic ammonium salts mentioned, for example, and also the stable organic compounds mentioned, particularly cellulose and lignocellulose, which are only converted or degraded in a low proportion, if at all, in the digestion tower. Relatively large solid particles and agglomerates, which are present in the original raw sludge, are frequently also only incompletely decomposed, even though they comprise the substances which can be decomposed anaerobically. The reason for this is that the contact surface for anaerobic conversion in such agglomerates is correspondingly small.

Processes for waste water treatment are known, for example, from EP 1 310 461 A1, EP 0 960 860 A1, US 2003/192831 A1, JP 2005-046691 A and the U.S. Pat. No. 4,370,235.

A sufficiently specific separation of cellulose and/or lignocellulose, particularly cellulose, from the raw sludge by mechanical processes such as sedimentation, sieving, filtration or centrifugation, is not possible with conventional processes, however. The raw sludge has exceptionally poor sedimentation and dewatering properties and also cannot be satisfactorily separated by other methods. In particular, a sufficiently specific separation of cellulose and/or lignocellulose, particularly cellulose, from the raw sludge cannot be achieved to a sufficient degree by customary disintegration processes, since the raw sludges are still present in highly viscous, pasty form, even after the disintegration, which results in a felt-like, highly conglomerated character of the raw sludge due to the fibers and gel-like fractions contained therein, which means that the sludges are only amenable with great difficulty, or not at all, to a subsequent mechanical separation. Although a slight improvement is achieved by disintegration, this is usually insufficient. The same applies to the other substrates known to those skilled in the art that are used for methane fermentation and likewise have the fibrous and gel-like constituents mentioned. Also in those substances amenable to fermentation, for example, grass and corn or grass silage and corn silage, manure or organic waste, it would be of enormous advantage if an advantageous and economic form of processing allowed the utilizable compounds cellulose and/or lignocellulose present therein to be isolated.

There exists, therefore, a need for an improved process which enables the specific separation, particularly isolation, of cellulose and/or lignocellulose, particularly cellulose, from those substrates that are at least to some extent amenable to fermentation such as, in particular, raw sludge originating from waste water.

It is an object of the present invention, therefore, to provide a process for obtaining cellulose and/or lignocellulose from at least one substrate that is at least to some extent amenable to fermentation such as, in particular, raw sludge originating from waste water, in particular such a process which has advantages compared to the customary methods known from the prior art. In particular, it is an object of the present invention to provide such a process which enables cellulose and/or lignocellulose, particularly cellulose, to be separated from such a substrate that is at least to some extent amenable to fermentation, such as, in particular, raw sludge originating from waste water and at the same time to design more efficiently the further processing of the remaining raw sludge, particularly the digestion process, particularly from an economic and/or ecological point of view.

This object is achieved by the subject matter claimed in the patent claims and the preferred embodiments of the subject matter disclosed in the present description below.

The present invention therefore relates to a process for obtaining cellulose or a mixture containing at least cellulose and at least lignocellulose from at least one substrate that is at least to some extent amenable to fermentation comprising at least the steps (1) to (3) and optionally (4), namely (1) conversion of the substrate via addition of at least one inorganic base into an aqueous mixture having a $pH \geq 8.5$, (2) ultrasound treatment of the aqueous mixture obtained after step (1), (3) separation of the aqueous mixture obtained after step (2) into a liquid aqueous phase and a disperse mixture containing cellulose or containing a mixture containing at least cellulose and at least lignocellulose and (4) optionally purification of the disperse mixture obtained after step (3) containing cellulose or a mixture containing at least cellulose and at least lignocellulose, wherein step (1) and step (2) of the process are both carried out at a temperature of <100° C., and wherein the ultrasound treatment in step (2) is effected in one or more treatment phases, where the duration of a treatment phase is in the range from 0.2 to 60 seconds and each treatment phase is carried out at a sonotrode frequency in a range from 14 to 22 kHz.

It has been found, surprisingly, that the process according to the invention facilitates obtaining cellulose or a mixture comprising at least cellulose and at least lignocellulose from at least one substrate that is at least to some extent amenable to fermentation, such as in particular from raw sludge, and therefore rendering these compounds utilizable for numerous sectors of industry and for numerous applications.

In particular, it has in this case been found, surprisingly, that the process according to the invention facilitates obtaining cellulose or a mixture comprising at least cellulose and at least lignocellulose, particularly cellulose, in high yields, for example up to 60% by weight, based on the total solids content of the substrate used that is at least to some extent amenable to fermentation, and/or high degrees of purity, for example at a purity in the range of 75 to 95% by weight. From the cellulose thus obtained, glucose or oligomers of glucose can be obtained in particular by means of cellulase, which in turn can be used—particularly by microorganisms—to prepare further substrates such as ethanol, butyric acid, butanol, acetone, citric acid and itaconic acid. It has been found in this case, surprisingly, that the cellulose prepared by the process according to the invention has a higher freedom from germs than cellulose obtained by customary processes and therefore glucose obtained from cellulose prepared by the process according to the invention is particularly suitable for further processing facilitated by microorganisms to give the products mentioned above.

It has also been found, surprisingly, that the process according to the invention facilitates converting substrates used that are at least to some extent amenable to fermentation, such as raw sludge, without energy-intensive processing, for example, processing under reduced pressure and/or at high temperatures, particularly at temperatures >100° C., to a state which enables cellulose or a mixture comprising at least cellulose and at least lignocellulose to be obtained and to be isolated from this substrate, particularly raw sludge.

Particularly surprisingly, it has been shown that the object of the present invention can be achieved by the combination of the process parameters of steps (1) and (2), particularly by the process parameters of the ultrasound treatment according to step (2), of the process according to the invention, since as a result the aqueous mixture thus obtained after step (2) is present in a state which enables a simple, rapidly practicable and effective mechanical separation of cellulose or a mixture comprising at least cellulose and at least lignocellulose, for example, by sieving, filtration and/or centrifugation. In particular, the aqueous mixture is not present—such as after exclusively ultrasound treatment, i.e. without carrying out step (1) or after carrying out only step (1) without ultrasound treatment—in highly viscous, pasty, i.e. gel-like form, which results in the compounds obtained therein being amenable only with difficulty, if at all, to a mechanical separation. In contrast, the mixture after step (2) of the process according to the invention is preferably in the form of an aqueous mixture comprising a liquid phase and in addition solid constituents clearly distinguishable and separable therefrom. It has been found in particular in this context, surprisingly, that the compounds particularly responsible for a gel-like form, such as water-insoluble polysaccharides, proteoglycans, glycoproteins and glycolipids, can be efficiently separated, particularly owing to the ultrasound treatment according to step (2) of the process according to the invention, from the cellulose to be obtained or the mixture to be obtained comprising at least cellulose and at least lignocellulose.

It has further been found, surprisingly, that at the same time the further processing of the remaining raw sludge, in particular the digestion process, can be more efficiently designed, particularly from an economic and/or ecological point of view, since cellulose or a mixture comprising at least cellulose and at least lignocellulose are already removed therefrom prior to using the raw sludge in the digestion process. The composition separated after the removal of cellulose or a mixture comprising at least cellulose and at least lignocellulose, in comparison to the substrate used that is at least to some extent amenable to fermentation, comprises a significantly increased proportion of compounds, particularly dissolved organic compounds, which can be effectively converted anaerobically.

This can be quantified, for example, by determining the COD value, i.e. the chemical oxygen demand of the separated composition. The fermentation, for example the digestion in the digestion tower, is therefore designed more effectively which, in addition to a shortening of the digestion process, leads to an increase in the amount of the resource material obtainable by the process, in this case particularly methane. In addition, possible accumulation of microorganisms, for example in fixed bed reactors, is thereby only facilitated.

The process according to the invention is a process for obtaining cellulose or a mixture comprising at least cellulose and at least lignocellulose from at least one substrate that is at least to some extent amenable to fermentation. The process according to the invention is preferably a process for obtaining cellulose from at least one substrate that is at least to some extent amenable to fermentation.

Substrates

Ultimately, all of the substrates known to those skilled in the art in connection with fermentation, particularly methane fermentation, and the production of biogas linked thereto, can be used as the substrates that are at least to some extent amenable to fermentation. These ultimately include all substrates which contain digestible or fermentable organic compounds. As is known, the anaerobic degradation of organic compounds by microorganisms is referred to as fermentation, that is to say the decomposition of relatively complex, possibly polymeric organic compounds such as polysaccharides, fats and proteins into low molecular weight compounds such as, in particular, methane, carbon dioxide and water and also ammonia and hydrogen sulfide. Particular preference is given to using fiber-containing materials. Such substrates include, for example, grass and corn, and also grass silage and corn silage, thin stillage, fodder beet, whole plant silages, green cuttings, stalk-type biomass, industrial fruit, liquid manure, press cake, rapeseed extraction meal, rapeseed press cake, beet leaf silage, sugar beets, manure, organic waste and raw sludge from waste water. The at least one substrate that is at least to some extent amenable to fermentation and is used in the process according to the invention comprises cellulose or a mixture comprising at least cellulose and at least lignocellulose at least in certain amounts separable therefrom, particularly preferably in a proportion of up to 70% by weight, for example in a proportion of 20 to 60% by weight, based on the total solids content of the substrate used.

Methods for determining the solids content are known to those skilled in the art. The solids content is preferably determined according to EN 12880 (S2A) via the determination of the dry residue.

The at least one substrate that is at least to some extent amenable to fermentation is therefore preferably selected from the group consisting of grass, corn, grass silage, corn silage, thin stillage, fodder beet, whole plant silages, green cuttings, stalk-type biomass, industrial fruit, liquid manure, press cake, rapeseed extraction meal, rapeseed press cake, beet leaf silage, sugar beets, manure, organic waste and raw sludge originating from waste water, particularly primary sludge, secondary sludge and/or digested sludge and also mixtures thereof. In the context of the process according to the invention, particular preference is given to using raw sludge from waste water as the at least one substrate that is at least to some extent amenable to fermentation.

The at least one substrate that is at least to some extent amenable to fermentation is preferably in the form of an aqueous mixture.

The at least one substrate that is at least to some extent amenable to fermentation is preferably a substrate amenable to fermentation.

Steps (1), (2), (3) and optionally (4) of the process according to the invention are preferably conducted in succession precisely in this sequence.

Step (1)

Step (1) of the process according to the invention is a conversion of the substrate that is at least to some extent amenable to fermentation into an aqueous mixture having a pH≥8.5, which is achieved by the addition of at least one inorganic base with which the pH is adjusted.

The aqueous mixture after the addition of the inorganic base preferably has a pH in the range of ≥8.5 to 13, particularly preferably in the range of 9.0 to 13 or 9.0 to 12.5, especially preferably in the range of 9.5 to 12.

In step (1) of the process according to the invention, the at least one inorganic base used is preferably a base selected from the group consisting of NaOH, KOH, $Na_2CO_3$, $K_2CO_3$, CaO, $Ca(OH)_2$ and MgO and also mixtures thereof. Products such as wood ash, which are rich in at least one of the bases mentioned above, can also be used. Preference is given to using NaOH and/or KOH, very particular preference being given to NaOH.

After the addition of the at least one inorganic base, an aqueous alkaline mixture is present. The bases may be added directly to the substrate, i.e. particularly as solids. This can be done, for example, if the substrate itself has a sufficiently high water content, for example, in the case of raw sludge from waste water. It is also possible to firstly prepare aqueous basic solutions or dispersions, preferably solutions of the bases, which are then added to the substrate. This is preferred, for example, if the substrate is a solid or a suspension having a high solids content. In such a case, water may also firstly be added to the substrate, for example, before the addition of the base or the aqueous basic solution. The base is preferably added in the form of aqueous basic solutions. After the addition of the at least one base, preferably the aqueous solution of at least one such base, a water-containing mixture having a pH≥8.5 is thus formed. This mixture comprises both liquid and solid components and can therefore also be referred to as a disperse mixture or disperse system.

In a preferred embodiment, the inorganic base used in step (1) of the process according to the invention is in the form of an aqueous solution or dispersion, preferably in the form of an aqueous solution.

In a preferred embodiment, an aqueous solution or dispersion of an inorganic base is used in step (1) comprising a proportion of inorganic base in the range of 30 to 80% by weight, preferably in the range of 35 to 75% by weight, particularly preferably 40 to 65% by weight, especially preferably 40 to 60% by weight, based in each case on the total weight of the aqueous solution or dispersion of the inorganic base used. The aqueous solution or dispersion of the at least one inorganic base is particularly preferably used in step (1) in an amount in the range of 1 to 10 mL, preferably in the range of 2 to 9 mL, particularly preferably in the range of 2.5 to 8 mL or in the range of 3 to 7 mL per L of the at least one substrate amenable to fermentation, in particular per L of raw sludge.

Step (1) and step (2) of the process according to the invention are preferably both carried out at a temperature of <98° C. or <95° C. or <90° C. or <80° C., particularly preferably <70° C., in particular <65° C.

In another preferred embodiment, step (1) and step (2) of the process according to the invention are both carried out at a temperature in the range of 10° C. to 90° C., preferably in a range from 20° C. to 80° C. or in a range from 30° C. to 80° C., particularly preferably in a range from 30° C. to 70° C. or 40° C. to 70° C. Step (1) and step (2) of the process according to the invention are particularly preferably both carried out at a temperature in the range of 30° C. to 40° C. or 50° C. to 60° C.

The temperature mentioned above is preferably in each case the substrate temperature of the at least one substrate that is at least to some extent amenable to a fermentation.

This means that the process according to the invention requires only low amounts of thermal energy supply. Thus, depending on the ambient temperature, the process is carried out at higher or lower temperatures. It is also particularly advantageous in this case that the process plant and the substrate to be processed do not need to be heated above 100° C. The latter would mean that a pressure increase would be necessary in addition to maintain the mixture to be processed and particularly the water contained therein in the liquid state, in addition to the required external supply of thermal energy which, especially in the case of industrial plants and the large amounts of substrate processed therein, is particularly energy-intensive and therefore environmentally harmful. It also follows from the above that the process, particularly steps (1) and (2), is therefore preferably carried out without changing the external environmental pressure, i.e. preferably at atmospheric pressure.

Step (2)

Step (2) of the process according to the invention provides an ultrasound treatment of the aqueous mixture obtained after step (1). This is preferably effected by means of at least one ultrasound device, in particular by means of at least one high-power ultrasound device. In particular, step (2) of the process according to the invention provides an ultrasound treatment of the aqueous mixture obtained after step (1) by which cavitation is generated.

In step (2) of the process according to the invention, a disintegration of the aqueous mixture obtained after step (1) preferably takes place by the ultrasound treatment, through which said mixture is converted into a state which facilitates a simple, rapidly practicable and effective mechanical separation which is carried out in step (3). By means of step (2), for example, aggregates possibly present in the mixture obtained after step (1) may be comminuted. In particular in this case—if raw sludge is used as substrate—gels composed of extracellular polymeric substances (EPS) formed from microorganisms present therein may be comminuted. Here, high power ultrasound generates high pressure oscillations in the kilohertz range which create microscopically small vacuum bubbles in the mixture (cavitation). If the bubbles implode between the pressure fluctuations, shear forces are formed which break up the surrounding cell walls, gel structures and/or molecular chains.

The ultrasound is preferably generated by at least one ultrasound unit and penetrates and is amplified in the substrate to be treated or in the mixture to be treated. Here, an ultrasound unit comprises at least one ultrasound transducer which generates the ultrasound and at least one ultrasound oscillator (sonotrode) by means of which the ultrasound penetrates and is amplified in the substrate to be treated or the mixture to be treated. In step (2) of the process according to the invention, one or more, for example 1 to 100 or 2 to 100 or 1 to 50 or 2 to 50 or 1 to 25 or 2 to 25 or 10 to 15 ultrasound units may be used.

The ultrasound treatment in step (2) of the process according to the invention can be carried out in one phase or also periodically, i.e. in several treatment phases (cycles). The duration of a treatment phase is in the range of 0.2 to 60 seconds. The ultrasound treatment in step (2) of the process according to the invention is carried out, for example, in 1 to 100, in particular in 1 to 25 or in 1 to 20 treatment phases. In another preferred embodiment, the ultrasound treatment in step (2) of the process according to the invention is carried out in at least one treatment phase, preferably in at least 2 or at least 3 treatment phases, particularly preferably in at least 5 treatment phases, especially preferably in at least 10 treatment phases, in particular in at least 15 treatment phases. The number and duration of the treatment phases may be adjusted depending on the nature of the mixture introduced from step (1). The duration of a treatment phase in step (2) of the process according to the invention is preferably in the range of 0.5 to 30 seconds, particularly preferably in the range of 1.0 to 25 seconds, especially preferably in the range of 2.0 to 20 seconds or in a range of 3.0 to 15 seconds. The individual treatment phases may take place directly in succession, which is preferred, or can be interrupted by time intervals, for example, by time intervals in the range of 10 seconds to 10 minutes.

Step (2) of the process is preferably carried out continuously, i.e. is carried out in a continuous operation. In particular, in this case, the aqueous mixture obtained after step (1) is passed continuously through at least one ultrasound reactor at a certain flow rate, for example, at a flow rate in the range of 500 L/h to 2000 L/h. The residence time of the aqueous mixture in the so-called cavitation zone, i.e. in the preferably geometrical area around the sonotrode of the at least one ultrasound unit dipping into the aqueous mixture, in which the aqueous mixture obtained after step (1) is subjected to ultrasound treatment, preferably corresponds in this case to the one or more treatment phase(s). If step (2) of the process is carried out continuously, the at least one ultrasound device preferably used in step (2) is in long-term operation, i.e. it does not need to be switched off after a certain time—for example owing to a required cooling of the device. Step (2) of the process according to the invention is preferably carried out continuously during the one or more treatment phases.

In order to be able to treat effectively the aqueous mixture obtained after step (1) used in step (2) of the process according to the invention with ultrasound, to achieve a sufficiently intense cavitation, an ultrasound device used to carry out step (2) must meet certain requirements, particularly with respect to the frequency of the sonotrodes. Ultrasound devices which can be used in step (2) of the process according to the invention are known to those skilled in the art, for example, from WO 2009/103530 A1. Suitable high performance ultrasound devices have been developed, inter alia, by Bsonic GmbH (the Cavit device for example) and may be obtained from this company.

The ultrasound treatment in step (2) of the process according to the invention is effected in one or more treatment phases, where each treatment phase is carried out at a sonotrode frequency in a range from 14 to 22 kHz. The sonotrode of each ultrasound unit generates here a sonotrode frequency in a range from 14 to 22 kHz. Each treatment phase in step (2) of the process according to the invention is preferably carried out at a sonotrode frequency in a range from 16 to 22 kHz or from 16 to 20 kHz, particularly preferably from 17 to 19 kHz.

The oscillations in each ultrasound unit are preferably introduced into the mixture to be treated according to step (2) of the process according to the invention, via the sonotrode linked to the transducer, at an amplitude of at least 30 µm (center-to-peak), particularly preferably of at least 40 µm (center-to-peak), especially preferably of at least 50 µm (center-to-peak).

The ultrasound treatment in step (2) of the process according to the invention is preferably carried out in one or more treatment phases, wherein in each treatment phase a power of at least 1 kW, preferably at least 2 kW, particularly preferably at least 3 kW is supplied to the mixture to be treated, preferably in the form of a cavitation. This power is preferably supplied to the aqueous mixture in this case by the at least one ultrasound unit.

The ultrasound treatment in step (2) of the process according to the invention is preferably carried out in one or more treatment phases, wherein in each treatment phase power is supplied to the mixture to be treated which corresponds to a power input of at least 30 $W/cm^2$, preferably at least 35 $W/cm^2$, particularly preferably at least 40 $W/cm^2$, in particular at least 45 $W/cm^2$ of the working surface of the sonotrodes.

The ultrasound treatment in step (2) of the process according to the invention is preferably carried out in one or more treatment phases, wherein in each treatment phase power is supplied to the mixture to be treated which corresponds to a power input in the range of 1 to 10 $W/cm^2$, preferably in the range of 2 to 10 $W/cm^2$, particularly preferably in the range of 3 to 10 $W/cm^2$ or in the range of 4 to 10 $W/cm^2$, in particular in the range of 5 to 10 $W/cm^2$ of the entire circumference of the sonotrodes.

The ultrasound treatment in step (2) of the process according to the invention is particularly preferably carried out in one or more treatment phases, wherein in each treatment phase a power of at least 1 kW, preferably at least 2 kW, particularly preferably at least 3 kW is supplied to the mixture to be treated, preferably in the form of a cavitation, which corresponds to a power input of at least 30 $W/cm^2$, preferably at least 35 $W/cm^2$, particularly preferably at least 40 $W/cm^2$, in particular at least 45 $W/cm^2$ of the working surface of the sonotrodes, or which corresponds to a power input in the range of 1 to 10 $W/cm^2$, preferably in the range of 2 to 10 $W/cm^2$, particularly preferably in the range of 3 to 10 $W/cm^2$ or in the range of 4 to 10 $W/cm^2$, in particular in the range of 5 to 10 $W/cm^2$ of the entire circumference of the sonotrodes.

The ultrasound device preferably used in step (2) is preferably suitable to treat under continuous operation 0.5 to 3 $m^3$/h, preferably 0.5 to 2 $m^3$/h of the mixture to be treated with ultrasound. The energy input is therefore preferably in the range of 2-20 kJ/L, particularly preferably 3-15 kJ/L of mixture.

Step (2) is preferably carried out in an ultrasound reactor which comprises at least one ultrasound unit. This reactor is preferably designed so that the mixture to be treated can be subjected continuously to a cavitation. The treatment is preferably carried out in a treatment phase or periodically.

The aqueous mixture after carrying out step (2) is preferably in the form of an aqueous mixture comprising a liquid phase and in addition solid constituents clearly distinguishable and separable therefrom.

Step (3)

Step (3) of the process according to the invention provides a separation of the aqueous mixture obtained after step (2)

into a liquid aqueous phase and a disperse mixture comprising cellulose or a mixture comprising at least cellulose and at least lignocellulose.

The separation in step (3) is preferably in the form of a mechanical separation. In the scope of this separation stage, the mechanical separation methods known to those skilled in the art in this context are used for separating disperse systems into solids and liquids. These separation processes are, in particular, sedimentation, centrifugation and filtration or sieve filtration, optionally in combination with pressing (use of filter presses). Such separation methods are feasible, for example, by using conventional systems and devices which are known to those skilled in the art in this field. In many of these systems and devices, more than one of the separation methods or separation principles mentioned are also combined with one another. Usable systems are, for example, vacuum belt filters. In this sieving step or sieve filtration step, the pore size of the sieve or filter is selected so that the anisotropic, elongated fibres of cellulose or a mixture comprising at least cellulose and at least lignocellulose remain on the sieve or filter material, while the spherical inorganic particles, which generally have particle sizes less than 10 μm (measured by microscope or wet sieving), together with the water still present or optionally added, pass through the sieve. Sieve and filtration systems of this kind and an appropriate choice of sieves and/or filters can be readily selected by those skilled in the art. This sieving or sieve filtration step can preferably be supplemented by an additional rinsing of the sieve residue (fiber material) with water, whereby inorganic particles possibly situated within the fiber material and/or adhering to the fibers are also rinsed through the sieve. An overview of applicable separation methods and separation principles is to be found in the specialist literature, for example, in "Technische Mikrobiologie" by Hermann Kretzschmar, pages 265 to 286, (Parey, 1968, ISBN 3489715144) or also in "Filters and Filtration Handbook" (Elsevier, Advanced Technology, 4$^{th}$ edition, ISBN 185617322).

It is possible to use, for example, filter presses, rotary filter systems, sieve drum presses, belt presses, press screw separators, centrifuges of various size and design such as decanters (screw discharge centrifuges), sieve notch or filter centrifuges, tube centrifuges, multi-chamber centrifuges or nozzle or plate separators, and also vacuum belt filters with sieving systems.

Step (3) of the process according to the invention preferably constitutes at least one separation method selected from the group consisting of sieve filtration and centrifugation methods and also methods which combine the above-mentioned methods with each other. The separation in step (3) is therefore preferably effected in the form of a mechanical separation, particularly preferably by means of a sieve filtration, a centrifugation or a combined sieve filtration centrifugation. In the case of the combined methods, the sequence of use of the methods is guided by the relevant nature of the mixture to be separated, in particular the fiber content thereof and/or the gel content thereof. For this purpose, press screw separators and/or decanters (screw discharge centrifuges) are preferably used.

After completion of step (2) of the process according to the invention, the aqueous mixture treated with ultrasound is preferably transferred to a decanter, that is to say, a screw discharge centrifuge. Here, the liquid aqueous phase containing in particular the gel-like constituents is separated from solid disperse constituents of the mixture. The solid disperse constituents are in particular fibrous material consisting mainly of cellulose or a mixture of cellulose and lignocellulose. The material thus separated is not dry but rather has a water content. The disperse mixture containing solids preferably has a solids content in the range of 10 to 40% by weight, particularly preferably in a range from 15 to 35% by weight or in the range of 15 to 30% by weight, based in each case on the total weight of the disperse mixture containing solids. The disperse mixture obtained according to step (3) preferably comprises cellulose or a mixture of cellulose and lignocellulose in a proportion of 75 to 95% by weight or of 80 to 90% by weight, based in each case on the solids content of the disperse mixture containing solids.

The disperse mixture obtained after step (3) comprising cellulose or a mixture of cellulose and lignocellulose already has a sufficient proportion of cellulose or a mixture of cellulose and lignocellulose for many application purposes. The disperse mixture obtained after step (3) can optionally be dried or be further dewatered, for example, by pressing, particularly high performance pressing, in order to further increase the proportion of solids in this mixture.

The purity of the disperse mixture obtainable after step (3) or an optional step (4) comprising cellulose or a mixture comprising at least cellulose and at least lignocellulose of cellulose present therein can be determined by firstly determining the nitrogen content of the disperse mixture according to DIN EN 25663 by means of which it can be determined whether the mixture is free from N-containing compounds. Additionally, for determination of the purity, the dry residue of the disperse mixture can be determined according to EN 12880 (S2A) and the residue on ignition of the disperse mixture according to EN 12879 (S3A).

Step (4)

The optional step (4) of the process according to the invention provides a purification of the disperse mixture obtained after step (3) comprising cellulose or a mixture comprising at least cellulose and at least lignocellulose. Step (4) thus serves to purify the disperse mixture obtained after step (3) in order to increase the proportion of cellulose or a mixture comprising at least cellulose and at least lignocellulose in this disperse mixture.

The purification in step (4) is preferably effected by washing, decanting, sieving and/or sieve filtration by addition of water, particularly preferably by washing with water.

The disperse mixture obtained according to step (3) comprises cellulose or a mixture comprising at least cellulose and at least lignocellulose and may possibly still contain further inorganic solid particles. By addition of water, these can be washed, decanted, sieved or sieve filtered in step (4), optionally by applying pressure. Practicable systems are, for example, vacuum belt filters. In this sieving step or sieve filtration step, the pore size of the sieve or filter is selected such that the anisotropic, elongated fibers of cellulose or a mixture comprising at least cellulose and at least lignocellulose remain on the sieve or filter material, while the spherical inorganic particles, which generally have particle sizes less than 10 μm (measured by microscope or wet sieving), together with the water still present or optionally added, pass through the sieve. Sieve and filtration systems of this kind and an appropriate choice of sieves and/or filters can be readily selected by those skilled in the art. This sieving or sieve filtration step can preferably be supplemented by an additional rinsing of the sieve residue (fiber material) with water, whereby inorganic particles possibly situated within the fiber material and/or adhering to the fibers are also rinsed through the sieve. This results in an aqueous dispersion of the inorganic particles potentially present.

The fibers of cellulose or a mixture comprising at least cellulose and at least lignocellulose thus obtained are further dewatered for example by pressing, particularly high performance pressing, and may then be further processed, optionally after further drying.

The following examples and comparative examples serve to illustrate the invention but are not to be interpreted as limiting.

EXAMPLES AND COMPARATIVE EXAMPLES

1. Exemplary Description of the Process According to the Invention

The process according to the invention is carried out using 1 m³ of a raw sludge (comprising 4.75 wt % solids according to EN 12880 (S2A) on determination of dry residue) which is adjusted to a pH of 10 by means of aqueous sodium hydroxide solution (step 1). An ultrasound treatment is then carried out in one treatment phase by means of a high performance ultrasound device from Bsonic GmbH (Halver, Germany; ultrasound conditions: duration of one treatment phase: 10 seconds; sonotrode amplitude: 40 μm, sonotrode frequency: 18 kHz; power input of 2.5 kW into the mixture to be treated) (step 2). The subsequent separation of the disperse mixture comprising cellulose or a mixture comprising at least cellulose and at least lignocellulose from the liquid aqueous phase of the aqueous mixture obtained after step (2) is carried out either by means of a decanter of the UCD 305 type from Gea Westfalia Separator Group GmbH (Oelde, Germany) or by means of a sieve belt type under vacuum and a doctor application with stripping (sieve mesh size: 0.4 mm) and affords in each case ca. 100 kg of a disperse mixture comprising cellulose or a mixture comprising at least cellulose and at least lignocellulose (comprising ca. 81.5 wt % water, based on the total weight of the disperse mixture) (step 3). The disperse mixture thus obtained comprises cellulose or a mixture of cellulose and lignocellulose in a proportion of ca. 80 to 90 wt %, based on the total solids content of the disperse mixture. The disperse mixture obtained after step (3) may optionally be further purified—depending on the intended application purpose—in order to further increase the proportion of cellulose or a mixture of cellulose and lignocellulose in the disperse mixture, for example, by washing and optionally sieving by addition of water (step 4).

2. Investigation of the Influence of Step (2) on the Process According to the Invention The influence of step (2) on the process according to the invention is investigated under laboratory conditions. A sample of raw sludge is heated to 20° C. or 60° C. and to this mixture in step (1) of the process according to the invention 6 mL NaOH of an aqueous NaOH solution are added in each case as inorganic base per L of raw sludge used as substrate with mechanical stirring. The NaOH solution used comprises in each case 45% by weight NaOH, based on the total weight of the aqueous NaOH solution. Step (1) of the process according to the invention is therefore carried out in each case at a temperature of 20° C. or 60° C. Step (1) is carried out over a period of 10 minutes with stirring.

Subsequently, an ultrasound treatment of the sample is carried out at a temperature of 20° C. or 60° C. The duration of an ultrasound treatment phase in step (2) is 1 second. In each case, either 3, 5, 10 or 20 treatment phases conducted directly in succession are carried out. The ultrasound device from Bsonic GmbH described in 1. is used in step (2).

Subsequently, the raw sludge thus treated by carrying out steps (1) and (2) is centrifuged (beaker centrifugation) (for a duration of 30 minutes at 3000 revolutions per minute) and the centrifuge supernatant or the centrifuge residue is investigated as specified in Table 1 below. The centrifuge residue comprises in this case the disperse mixture comprising cellulose or a mixture of cellulose and lignocellulose obtained after step (3) of the process according to the invention. The centrifuge supernatant comprises in this case the aqueous liquid phase obtained after step (3) of the process according to the invention.

For comparison, a corresponding process is carried out in each case without performing step (2) (comparative examples C1 and C2). For this purpose, the raw sludge obtained after carrying out step (1) is directly centrifuged and the centrifuge supernatant or the centrifuge residue is investigated analogously as specified in Table 1 below.

In addition, a comparative process is carried out without performing steps (1) and (2) (comparative example C3). For this purpose, the raw sludge is directly centrifuged and the centrifuge supernatant or the centrifuge residue is investigated analogously as specified in Table 1 below.

The chemical oxygen demand (COD) of the centrifuge supernatant is determined in each case according to DIN 38409 H41. This is a measure of the dissolved oxidizable organic substances in the centrifuge supernatant. The COD specifies the amount of oxygen (in mg/L), i.e. the amount of oxygen in mg per L of centrifuge supernatant, which is required for oxidation of the oxidizable organic substances contained in this liter.

The higher the determined COD value is, the more dissolved organic materials are present in the centrifuge supernatant, i.e. the more these materials can be converted anaerobically in the digestion process, whereby this process can be more efficiently and more economically designed. Furthermore, a high COD value is a measure of the amount of organic compounds which could be efficiently removed from the cellulose to be obtained or the mixture comprising at least cellulose and at least lignocellulose to be obtained by the process according to the invention. As is evident from Table 1 below, a COD value of the centrifuge supernatant of more than 16 000 mg/L COD (example 2d) can be achieved with the process according to the invention, whereas only a significantly lower value of 11 000 mg/L COD (comparative example C2) is achieved without ultrasound treatment according to step (2). In the case of totally untreated raw sludge only a COD value of 1100 mg/L is achieved (comparative example C3).

In addition, the amount of centrifuge residue is determined in g per L of raw sludge used, from which in turn the solids content of the centrifuge residue and also the dry residue of the centrifuge residue and optionally also the residue on ignition can be determined.

The lower the amount of centrifuge residue is, the greater is the amount of cellulose to be obtained or of the mixture comprising at least cellulose and at least lignocellulose to be obtained in the disperse mixture obtained after step (3), i.e. the more the further compounds contaminating the products to be obtained could be removed from these by means of the ultrasound treatment according to step (2), whereby isolation of cellulose or the mixture comprising at least cellulose and at least lignocellulose from the centrifuge residue is possible. As is evident from Table 1 below, a centrifuge residue of 73.3 g (from one liter of raw sludge) (example 2d) is achieved with the process according to the invention, whereas the centrifuge residue without ultrasound treatment is more than twice as high (159.6 g/L of raw sludge in the case of comparative example 2).

TABLE 1

| Example/comparative example | Temperature for performing step (1) | Temperature for performing step (2) | Number of ultrasound treatment phases in step (2) | COD of centrifuge residue [mg/L] | Centrifuge residue [g/L of raw sludge] | Solids content of the centrifuge residue [% by weight] | Dry residue of the centrifuge residue [g/L of raw sludge] |
|---|---|---|---|---|---|---|---|
| Example 1a (E1a) | 20° C. | 20° C. | 3 | 10 900 | 217.0 | 12.2 | 26.5 |
| Example 1b (E1b) | 20° C. | 20° C. | 5 | 11 700 | 195.0 | 12.9 | 25.2 |
| Example 1c (E1c) | 20° C. | 20° C. | 10 | 11 700 | 197.6 | 13.0 | 25.6 |
| Example 1d (E1d) | 20° C. | 20° C. | 20 | 13 000 | 173.9 | 13.7 | 23.9 |
| Comparative example 1 (C1) | 20° C. | 20° C. | — | 9 540 | 266.8 | 10.8 | 28.8 |
| Example 2a (E2a) | 60° C. | 60° C. | 3 | 13 700 | 127.3 | 16.3 | 20.7 |
| Example 2b (E2b) | 60° C. | 60° C. | 5 | 14 200 | 105.2 | 17.0 | 17.9 |
| Example 2c (E2c) | 60° C. | 60° C. | 10 | 15 600 | 106.6 | 18.1 | 19.3 |
| Example 2d (E2d) | 60° C. | 60° C. | 20 | 16 400 | 73.3 | 18.0 | 13.2 |
| Comparative example 2 (C2) | 60° C. | 60° C. | — | 11 200 | 159.6 | 13.9 | 22.2 |
| Comparative example 3 (C3) | — | — | — | 1 100 | n.d. | n.d. | 33.2 | n.d. not determined

The invention claimed is:

1. A process for obtaining cellulose from raw sludge originating from waste water as at least one substrate that is at least to some extent amenable to fermentation, the process comprising at least the steps (1) to (3) and optionally (4):
   (1) conversion of the at least one substrate via addition of at least one inorganic base into an aqueous mixture having a pH greater than or equal to 8.5,
   (2) ultrasound treatment of the aqueous mixture obtained after step (1),
   (3) separation of the aqueous mixture obtained after step (2) into a liquid aqueous phase and a disperse mixture containing cellulose or a mixture containing at least cellulose and at least lignocellulose and
   (4) optionally purification of the disperse mixture obtained after step (3) containing cellulose or a mixture containing at least cellulose and at least lignocellulose,
   wherein step (1) and step (2) of the process are both carried out at a temperature of 40° C. or higher, and wherein the ultrasound treatment in step (2) is effected in five or more treatment phases, where the duration of a treatment phase is in the range from 1 to 30 seconds and each treatment phase is carried out at a sonotrode frequency in a range from 14 to 22 kHz.

2. The process as claimed in claim 1, wherein the duration of the treatment phase in step (2) is in the range of 2 to 25 seconds.

3. The process as claimed in claim 1, wherein the treatment phase in step (2) is carried out at a sonotrode frequency in a range from 16 to 20 kHz.

4. The process as claimed in claim 1, wherein a power of at least 2 kW is supplied to the mixture to be treated in the treatment phase in step (2).

5. The process as claimed in claim 4, wherein the power corresponds to a power input in the range of 1 to 10 W/cm$^2$ of the entire circumference of the sonotrodes.

6. The process as claimed in claim 1, wherein the ultrasound treatment in step (2) of the process is carried out by means of at least one ultrasound unit, wherein each ultrasound unit comprises at least one ultrasound transducer and at least one ultrasound oscillator.

7. The process as claimed in claim 1, wherein step (1) and step (2) of the process are both carried out at a temperature in the range of 50° C. to 70° C.

8. The process as claimed in claim 1, wherein a pH in the range of 9 to 13 is set in step (1).

9. The process as claimed in claim 1, wherein the at least one inorganic base used in step (1) is a base selected from the group consisting of NaOH, KOH, $Na_2CO_3$, $K_2CO_3$, CaO, $Ca(OH)_2$, MgO, and mixtures thereof.

10. The process as claimed in claim 1, wherein an aqueous solution or dispersion of an inorganic base is used in step (1) comprising a proportion of inorganic base in the range of 30 to 80% by weight, based on the total weight of the aqueous solution or dispersion containing the at least one inorganic base.

11. The process as claimed in claim 10, wherein the aqueous solution or dispersion of the inorganic base in step (1) is used in an amount in the range of 1 to 10 mL per L of the at least one substrate that is amenable to fermentation.

12. The process as claimed in claim 1, wherein the separation in step (3) is in the form of a mechanical separation.

13. The process as claimed in claim 1, wherein the separation in step (3) is effected by means of sieve filtration, centrifugation or a combined sieve filtration centrifugation.

14. The process as claimed in claim 1, wherein the purification in step (4) is effected by washing, decanting, sieving and/or sieve filtration by addition of water.

15. The process as claimed in claim 2, wherein the treatment phase in step (2) is carried out at a sonotrode frequency in a range from 16 to 20 kHz.

16. The process as claimed in claim 3, wherein a power of at least 2 kW is supplied to the mixture to be treated in the treatment phase in step (2).

17. The process as claimed in claim 16, wherein the power corresponds to a power input in the range of 1 to 10 W/cm$^2$ of the entire circumference of the sonotrodes.

18. The process as claimed in claim 16, wherein the power corresponds to a power input in the range of 1 to 10 W/cm$^2$ of the entire circumference of the sonotrodes.

19. The process of claim 1, wherein step (1) and step (2) of the process are both carried out at a temperature of 50° C. or higher.

20. The process of claim 1, wherein step (1) and step (2) of the process are both carried out at a temperature in the range of 40° C. to less than 98° C.

21. A process for obtaining cellulose from raw sludge originating from waste water as at least one substrate that is at least to some extent amenable to fermentation, the process comprising steps (1) to (4):

(1) conversion of the substrate via addition of at least one inorganic base into an aqueous mixture having a pH greater than or equal to 8.5,
(2) ultrasound treatment of the aqueous mixture obtained after step (1),
(3) separation of the aqueous mixture obtained after step (2) into a liquid aqueous phase and a disperse mixture containing cellulose or a mixture containing at least cellulose and at least lignocellulose and
(4) purification of the disperse mixture obtained after step (3) containing cellulose or a mixture containing at least cellulose and at least lignocellulose,
wherein step (1) and step (2) of the process are both carried out at a temperature of 40° C. or higher, and
wherein the ultrasound treatment in step (2) is effected in five or more treatment phases, where the duration of a treatment phase is in the range from 1 to 30 seconds and each treatment phase is carried out at a sonotrode frequency in a range from 14 to 22 kHz.

22. The process of claim 21, wherein step (1) and step (2) of the process are both carried out at a temperature of 50° C. or higher.

23. The process of claim 21, wherein step (1) and step (2) of the process are both carried out at a temperature in the range of 40° C. to less than 98° C.

\* \* \* \* \*